US012214799B2

(12) United States Patent
Kellogg et al.

(10) Patent No.: US 12,214,799 B2
(45) Date of Patent: Feb. 4, 2025

(54) COMPUTING DEVICE AND METHOD FOR FACILITATING MODIFICATION OF THE ROUTE OF A VEHICLE

(71) Applicant: THE BOEING COMPANY, Chicago, IL (US)

(72) Inventors: Tad W. Kellogg, Bellevue, WA (US); Troy P. Kellogg, Moncks Corner, SC (US); Michael J. Marich, Seal Beach, CA (US); William A. LaForge, Charleston, SC (US)

(73) Assignee: The Boeing Company, Arlington, VA (US)

( * ) Notice: Subject to any disclaimer, the term of this patent is extended or adjusted under 35 U.S.C. 154(b) by 4 days.

(21) Appl. No.: 17/590,889

(22) Filed: Feb. 2, 2022

(65) Prior Publication Data

US 2022/0258762 A1    Aug. 18, 2022

Related U.S. Application Data

(60) Provisional application No. 63/150,145, filed on Feb. 17, 2021.

(51) Int. Cl.
*B60W 60/00*        (2020.01)
*B60W 50/00*        (2006.01)

(52) U.S. Cl.
CPC .......... *B60W 60/001* (2020.02); *B60W 50/00* (2013.01); *B60W 2050/0075* (2013.01)

(58) Field of Classification Search
CPC .............. B60W 60/001; B60W 50/00; B60W 2050/0075; B60W 40/068;

(Continued)

(56) References Cited

U.S. PATENT DOCUMENTS 10,275,662 B1    4/2019  Askeland
2018/0039831 A1*  2/2018  Bergqvist ............... G06V 40/40
(Continued)

FOREIGN PATENT DOCUMENTS

WO    WO-2017053415 A1 *  3/2017  ......... G06K 9/00791

OTHER PUBLICATIONS

Ghodrati, Sajjad et al., "Application of image edge detection methods for precise estimation of the standard surface roughness parameters: Polypropylene/ethylene-propylene-diene-monomer blend as a case study," Measurement, 138:80-90, (2019).

(Continued)

*Primary Examiner* — Rodney A Butler
(74) *Attorney, Agent, or Firm* — Harrity & Harrity, LLP (57) ABSTRACT

A computing device, method and computer program product are provided for facilitating modification of the route of an autonomous surface vehicle. In the context of a method, a stylized image of an input image, such as a photographic image, is constructed. The stylized image distinguishes between surfaces having different texture that are present in the input image. Based upon the stylized image, the method also includes determining a frictional coefficient associated with at least some of the surfaces having different texture. The method further includes determining whether the route of the autonomous surface vehicle is to be altered from a predefined route based upon the frictional coefficient that has been determined to be associated with a surface over which the predefined route of the autonomous surface vehicle extends.

20 Claims, 4 Drawing Sheets

(58) Field of Classification Search
CPC ..... B60W 2050/0005; B60W 2552/40; B60W 2556/45; G01C 21/3415; G01C 21/20; G06V 10/54; G06V 20/17; G08G 5/0069; G08G 5/0078; G08G 5/0091; G08G 5/045; G08G 5/065; G05D 1/0246; G06N 3/08; G06N 20/00; G06T 11/001; G06T 7/40; G06T 2207/10004
See application file for complete search history.

(56) References Cited

U.S. PATENT DOCUMENTS

| | | |
|---|---|---|
| 2018/0276832 A1 | 9/2018 | Aikin |
| 2019/0172361 A1 | 6/2019 | Schwindt |
| 2020/0094843 A1* | 3/2020 | Bärecke ............... B60W 10/22 |
| 2020/0189567 A1 | 6/2020 | Silver et al. |
| 2020/0239032 A1* | 7/2020 | Kamata ........... B60W 60/00253 |
| 2020/0285867 A1 | 9/2020 | Jonasson et al. |

OTHER PUBLICATIONS

Roychowdhury, Sohini et al., "Machine Learning Models for Road Surface and Friction Estimation using Front-Camera Images," 2018 International Joint Conference on Neural Networks, IEEE, (Jul. 8, 2018).

EP Application No. 22156364.6, EP Extended Search Report mailed Jul. 14, 2022.

Extended European Search Report for European Application No. EP241980184 dated Dec. 18, 2024, 6 pages.

\* cited by examiner

COMPUTING DEVICE AND METHOD FOR FACILITATING MODIFICATION OF THE ROUTE OF A VEHICLE

CROSS-REFERENCE TO RELATED APPLICATIONS

This application claims benefit of U.S. Provisional Application No. 63/150,145, filed Feb. 17, 2021, the entire contents of which are incorporated herein by reference.

TECHNOLOGICAL FIELD

An example embodiment relates generally to a computing device and method for facilitating modification of the route of an autonomous surface vehicle and, more particularly, to a computing device and method for determining whether that route of an autonomous surface vehicle is to be altered based upon the frictional coefficient of a surface over which the autonomous surface vehicle is to drive.

BACKGROUND

Autonomous surface vehicles are utilized in a variety of applications. Autonomous surface vehicles include autonomous cars, trucks and other ground-based vehicles, as well as robots or the like that are configured to move autonomously along a predefined route. Unmanned air vehicles (UAVs) also constitute autonomous surface vehicles as the UAVs generally taxi or otherwise drive along the surface, such as prior to flight, following flight or otherwise. By way of example, a UAV may taxi along a runway, a taxiway or the flight deck of an aircraft carrier or other vehicle from which the UAV is launched, both in advance of the flight of the UAV and following the return and landing of the UAV.

The route taken by an autonomous surface vehicle may be predefined so as to extend from an origin to a destination. This predefined route may take into account the roads, runways, taxiways or other paths available to the autonomous surface vehicle as well as any known obstructions that should be avoided by the autonomous surface vehicle. During travel, an autonomous surface vehicle may also monitor its surroundings so as to identify any unanticipated obstructions, such as another vehicle or piece of equipment, located along the predefined route in order to permit the route to be dynamically modified to avoid such obstructions.

In certain circumstances, the characteristics of the surface over which an autonomous surface vehicle is to drive may change so as to increase the risk that the autonomous surface vehicle will slip or otherwise deviate from its route. The surface characteristics may change due to weather conditions, such as heat, ice, snow, moisture, etc., and/or due to degradation in the surface itself. As a result of the changes in the surface characteristics, the performance of the autonomous surface vehicle may be adversely affected. For example, an autonomous surface vehicle that attempts to drive over a surface covered by ice may slip or otherwise at least partially lose control, which may increase the risk of an accident involving the autonomous surface vehicle. Such accidents may, in turn, increase the costs associated with operation of an autonomous surface vehicle and may delay or prevent operation of the autonomous surface vehicle, at least for a period of time during which the autonomous surface vehicle is repaired.

BRIEF SUMMARY

A computing device, method and computer program product are provided in accordance with an example embodiment for facilitating modification of the route of an autonomous surface vehicle. In this regard, the computing device, method and computer program product determine the frictional coefficient associated with at least some of the surfaces over which the predefined route of the autonomous surface vehicle is to extend and determine whether the route of the autonomous surface vehicle should be altered based upon the frictional coefficient. In this regard, the computing device, method and computer program product may take into account changes in the surfaces over which the autonomous surface vehicle is to drive and may cause the route taken by the autonomous surface vehicle to be modified to avoid certain surfaces that have changed in such a manner so as to increase the risk of the autonomous surface vehicle slipping or otherwise at least partially losing control. By modifying the route, the risk of an accident or other incident involving the autonomous surface vehicle may therefore be reduced. In another example embodiment, a computing device, method and computer program product are provided for training machine learning models to facilitate the modification of the route of an autonomous surface vehicle.

In an example embodiment, a method is provided for facilitating modification of a route of an autonomous surface vehicle. The method includes constructing a stylized image of an input image, such as a photographic image. The stylized image distinguishes between surfaces having different texture that are present in the input image. Based upon the stylized image, the method also includes determining a frictional coefficient associated with at least some of the surfaces having different texture. The method further includes determining whether the route of the autonomous surface vehicle is to be altered from a predefined route based upon the frictional coefficient that has been determined to be associated with a surface over which the predefined route of the autonomous surface vehicle extends.

The method of an example embodiment constructs the stylized image of the input image by generating the stylized image utilizing a first machine learning model that has been trained to distinguish between surfaces having different texture that appear in images. In an example embodiment, the method constructs the stylized image of the input image by defining geometric objects to represent the surfaces having different texture that are present in the input image and by associating texture information with respective geometric objects. The method of an example embodiment determines the frictional coefficient utilizing a second machine learning model that has been trained to estimate the frictional coefficients of surfaces having different texture that appear in stylized images.

The method may also include modifying the route of the autonomous surface vehicle in response to determining that the route of the autonomous surface vehicle is to be altered from the predefined route. In this example embodiment, the method may also include providing the route, as modified, to a routing system of the autonomous surface vehicle. In an example embodiment, the method further includes receiving the input image that has been captured by an image capture device of the autonomous surface vehicle.

In another an example embodiment, a computing device is provided that is configured to facilitate modification of a route of an autonomous surface vehicle. The computing device includes processing circuitry configured to construct a stylized image of an input image, such as a photographic image. The stylized image distinguishes between surfaces having different texture that are present in the input image. Based upon the stylized image, the processing circuitry is also configured to determine a frictional coefficient associated with at least some of the surfaces having different texture. The processing circuitry is further configured to determine whether the route of the autonomous surface vehicle is to be altered from a predefined route based upon the frictional coefficient that has been determined to be associated with a surface over which the predefined route of the autonomous surface vehicle extends.

The processing circuitry of an example embodiment includes a first machine learning model that has been trained to distinguish between surfaces having different texture that appear in images. The processing circuitry of this example embodiment is configured to construct the stylized image of the input image utilizing the first machine learning model. In an example embodiment, the processing circuitry is configured to construct the stylized image of the input image by defining geometric objects to represent the surfaces having different texture that are present in the input image and by associating texture information with respective geometric objects. The processing circuitry of an example embodiment includes a second machine learning model that has been trained to estimate the frictional coefficients of surfaces having different texture that appear in stylized image. The processing circuitry is configured to determine the frictional coefficient utilizing the second machine learning model.

The processing circuitry of an example embodiment is further configured to modify the route of the autonomous surface vehicle in response to determining that the route of the autonomous surface vehicle is to be altered from the predefined route. In this example embodiment, the computing device may include a communication interface, responsive to the processing circuitry, configured to provide the route, as modified, to a routing system of the autonomous surface vehicle. The communication interface of an example embodiment is configured to receive the input image that has been captured by an image capture device of the autonomous surface vehicle.

In a further example embodiment, a computer program product is provided for facilitating modification of a route of an autonomous surface vehicle. The computer program product includes a non-transitory computer readable medium having program code stored thereon with the program code including program code instructions configured, upon execution, to construct a stylized image of an input image, such as a photographic image. The stylized image distinguishes between surfaces having different texture that are present in the input image. Based upon the stylized image, the program code instructions are also configured to determine a frictional coefficient associated with at least some of the surfaces having different texture. The program code instructions are further configured to determine whether the route of the autonomous surface vehicle is to be altered from a predefined route based upon the frictional coefficient that has been determined to be associated with a surface over which the predefined route of the autonomous surface vehicle extends.

The program code instructions configured to construct the stylized image of the input image may include program code instructions configured to generate the stylized image utilizing a first machine learning model that has been trained to distinguish between surfaces having different texture that appear in images. In an example embodiment, the program code instructions configured to construct the stylized image of the input image include program code instructions configured to define geometric objects to represent the surfaces having different texture that are present in the input image and program code instructions configured to associate texture information with respective geometric objects. The program code instructions configured to determine the frictional coefficient may include program code instructions configured to utilize a second machine learning model that has been trained to estimate the frictional coefficients of surfaces having different texture that appear in stylized images.

The program code may also include program code instructions configured to modify the route of the autonomous surface vehicle in response to determining that the route of the autonomous surface vehicle is to be altered from the predefined route. In this example embodiment, the program may also include program code instructions configured to provide the route, as modified, to a routing system of the autonomous surface vehicle. In an example embodiment, the program code further includes program code instructions configured to receive the input image that has been captured by an image capture device of the autonomous surface vehicle.

In an example embodiment, a method is provided for training machine learning models to facilitate modification of a route of an autonomous surface vehicle. The method includes training a first machine learning model, based upon a plurality of training images depicting surfaces having different, known textures, to distinguish between surfaces having different textures and to construct a stylized image from a respective training input image that distinguishes between surfaces having different texture that are present in the respective training image. The method also includes storing the first machine learning model. Based upon a plurality of stylized images that distinguish between surfaces having different texture and also based upon predefined frictional coefficients associated with surfaces having different texture, the method further includes training a second machine learning model to determine a frictional coefficient associated with at least some of the surfaces having different texture. The method also includes storing the second machine learning model.

The method of an example embodiment also includes utilizing the first machine learning model to construct the plurality of stylized images that are utilized to train the second machine learning model from respective training images. The first machine learning model may be trained to construct the stylized image from the respective training image by defining geometric objects to represent the surfaces having different texture that are present in the respective training image and by associating texture information with respective geometric objects. The method of an example embodiment also includes receiving the training images depicting surfaces over which an autonomous surface vehicle is capable of driving.

In another example embodiment, a computing device is provided that is configured to train machine learning models to facilitate modification of a route of an autonomous surface vehicle. The computing device includes processing circuitry configured to train a first machine learning model, based upon a plurality of training images depicting surfaces having different, known textures, to distinguish between surfaces having different textures and to construct a stylized image from a respective training image that distinguishes between surfaces having different texture that are present in the respective training image. Based upon a plurality of stylized images that distinguish between surfaces having different texture and also based upon predefined frictional coefficients associated with surfaces having different texture, the processing circuitry is also configured to train a second machine learning model to determine a frictional coefficient associated with at least some of the surfaces having different texture. The computing device also includes a memory device configured to store the first and second machine learning models.

The processing circuitry of an example embodiment is also configured to utilize the first machine learning model to construct the plurality of stylized images that are utilized to train the second machine learning model from respective training images. The first machine learning model may be trained to construct the stylized image from the respective training image by defining geometric objects to represent the surfaces having different texture that are present in the respective training image and by associating texture information with respective geometric objects. The computing device of an example embodiment also includes a communication interface configured to receive the training images depicting surfaces over which an autonomous surface vehicle is capable of driving.

In a further example embodiment, a computer program product is provided that is configured to train machine learning models to facilitate modification of a route of an autonomous surface vehicle. The computer program product includes a non-transitory computer readable medium having program code stored thereon with the program code including program code instructions configured, upon execution, to train a first machine learning model, based upon a plurality of training images depicting surfaces having different, known textures, to distinguish between surfaces having different textures and to construct a stylized image from a respective training image that distinguishes between surfaces having different texture that are present in the respective training image. Based upon a plurality of stylized images that distinguish between surfaces having different texture and also based upon predefined frictional coefficients associated with surfaces having different texture, the program code instructions are also configured to train a second machine learning model to determine a frictional coefficient associated with at least some of the surfaces having different texture. The program code instructions are further configured to cause the first and second machine learning models to be stored.

The program code instructions of an example embodiment are also configured to utilize the first machine learning model to construct the plurality of stylized images that are utilized to train the second machine learning model from respective training images. The first machine learning model may be trained to construct the stylized image from the respective training image by defining geometric objects to represent the surfaces having different texture that are present in the respective training image and by associating texture information with respective geometric objects. The program code instructions of an example embodiment are also configured to receive the training images depicting surfaces over which an autonomous surface vehicle is capable of driving.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A computing device, method and computer program product are provided in accordance with an example embodiment in order to facilitate modification of a route of an autonomous surface vehicle. As described below, the route of the autonomous surface vehicle may be modified based upon information, such as the frictional coefficients, associated with the surfaces over which the route of the autonomous surface vehicle extends.

Figure 1:
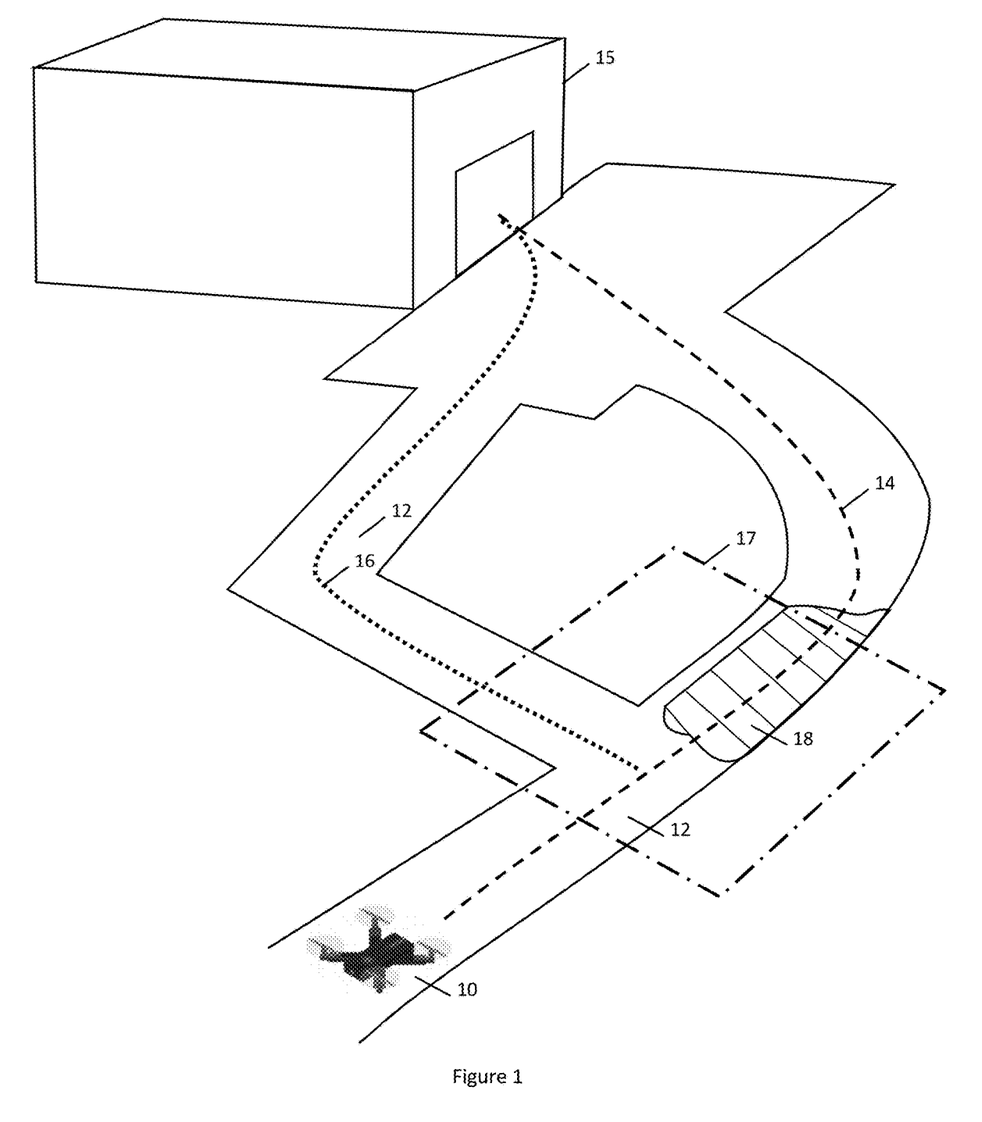
FIG. 1 is a perspective view of an autonomous surface vehicle and, more particularly, an unmanned air vehicle (UAV) and an indication of a predefined route along which the UAV is to be driven.

One example of an autonomous surface vehicle 10, namely, an unmanned air vehicle ("UAV"), is depicted in FIG. 1. Although the UAV is intended to fly, the UAV is also configured to drive along a surface, such as in an instance in which the UAV is taxiing as shown in FIG. 1 along one or more runways and taxiways 12, either in advance of a flight or following a flight. As shown in dashed lines, a route 14 along which the UAV is to drive may be predefined so as to extend from the current location of the UAV to an intended destination, such as location on a runway in advance of taking off, a location in a hangar or other storage bay 15 following return of the UAV from a flight or the like.

An autonomous surface vehicle 10, such as a UAV, may drive over a variety of different surfaces formed of different materials including, for example, concrete surfaces, asphalt surfaces, etc. These surfaces may have a variety of different surface characteristics attributable, for example, to the material that forms the surface, e.g., concrete, asphalt, metal, etc., and the condition of the material that forms the surface, such as newly formed surfaces to surfaces in various stages of degradation. Additionally, the surface characteristics may be dependent upon the weather or other environmental factors to which a surface is exposed. For example, the surface may be covered with ice or snow or may be wet. As described below, the characteristics of the surfaces over which the autonomous surface vehicle is to drive potentially impact the performance of the autonomous surface vehicle. For example, surfaces that are covered by ice may increase the risk that the autonomous surface vehicle will slip or otherwise at least partially lose control, thereby potentially becoming displaced from the route that the autonomous surface vehicle planned to follow.

The autonomous surface vehicle 10 may be configured to drive along a route 14 that extends across the ground, such as along roads, paths, runways or taxiways 12 that have been formed across the ground. However, autonomous surface vehicles may also be configured to drive across other types of surfaces. In relation to UAVs, for example, some UAVs may be launched from the deck of a ship or other marine vessel such that the route that such UAVs are to travel extends along the deck of the ship or other marine vessel. As such, the surface along which the UAV travels in these embodiments may be formed of other materials having different surface characteristics, such as metallic and/or composite materials. Still further, some autonomous surface vehicles may be robots that are configured to travel along predefined routes that may be indoors or outdoors. As such, the surfaces over which such robots travel may be formed of any of a wide variety of different types of materials, including concrete, dirt, grass, gravel, etc.

Figure 2:
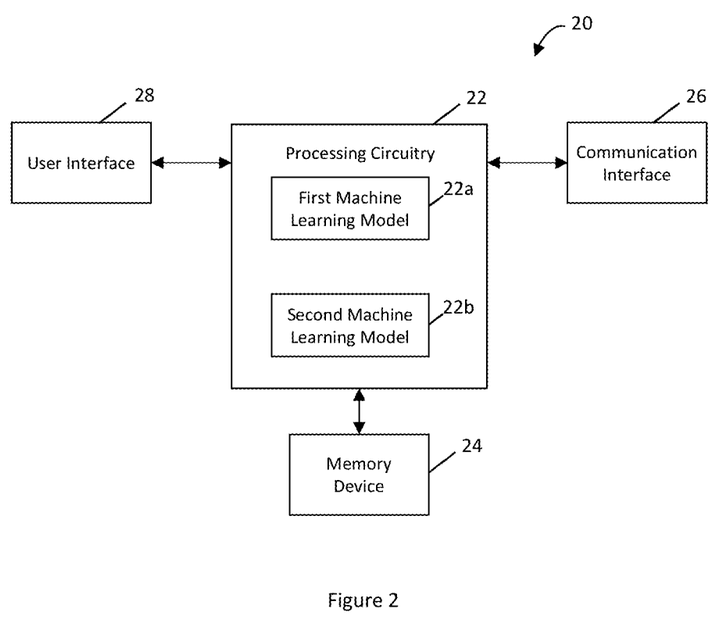
FIG. 2 is a block diagram of a computing device that may be specifically configured in accordance with an example embodiment of the present disclosure.

In order to identify the instances in which the predefined route 14 of an autonomous surface vehicle 10 is to extend over a surface that may subject the autonomous surface vehicle to increased risk of slippage or other performance degradation brought about by an at least partial loss of control, a computing device, method and computer program product are provided in order to identify such surfaces and to facilitate modification of the route to be taken by the autonomous surface vehicle so as to reduce the risk of slippage or other performance degradation. In one embodiment, the computing device is embodied by a navigation system, such as may be onboard the autonomous surface vehicle 10 or offboard but in communication with the autonomous surface vehicle. However, the computing device may alternatively be embodied by any of a variety of computing platforms including, for example, a server, a computer workstation, a network of distributed computing devices, a personal computer, a tablet computer, etc. Thus, the computing device does not require a specific hardware design, but any of a variety of computing platforms may be configured to operate as described herein. Regardless of the manner in which the computing device is configured, the computing device 20 of this example embodiment includes, is associated with or is otherwise in communication with processing circuitry 22 and memory device 24 as shown in FIG. 2. In some embodiments, the computing device also optionally includes, is associated with or is in communication with a communication interface 26 and/or a user interface 28.

In some embodiments, the processing circuitry 22 (and/or co-processors or any other processors assisting or otherwise associated with the processing circuitry) can be in communication with the memory device 24 via a bus for passing information among components of the computing device 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The computing device 20 of an example embodiment can also optionally include the communication interface 26. The communication interface can be any means such as a device or circuitry embodied in either hardware or a combination of hardware and software that is configured to receive and/or transmit data from/to other electronic devices in communication with the apparatus. The communication interface can be configured to communicate in accordance with various wireless protocols. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

The computing device 20 may also optionally include a user interface 28 that may, in turn, be in communication with the processing circuitry 22 to provide output to the user and, in some embodiments, to receive an indication of a user input. The user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory device 24, and/or the like).

Figure 3:
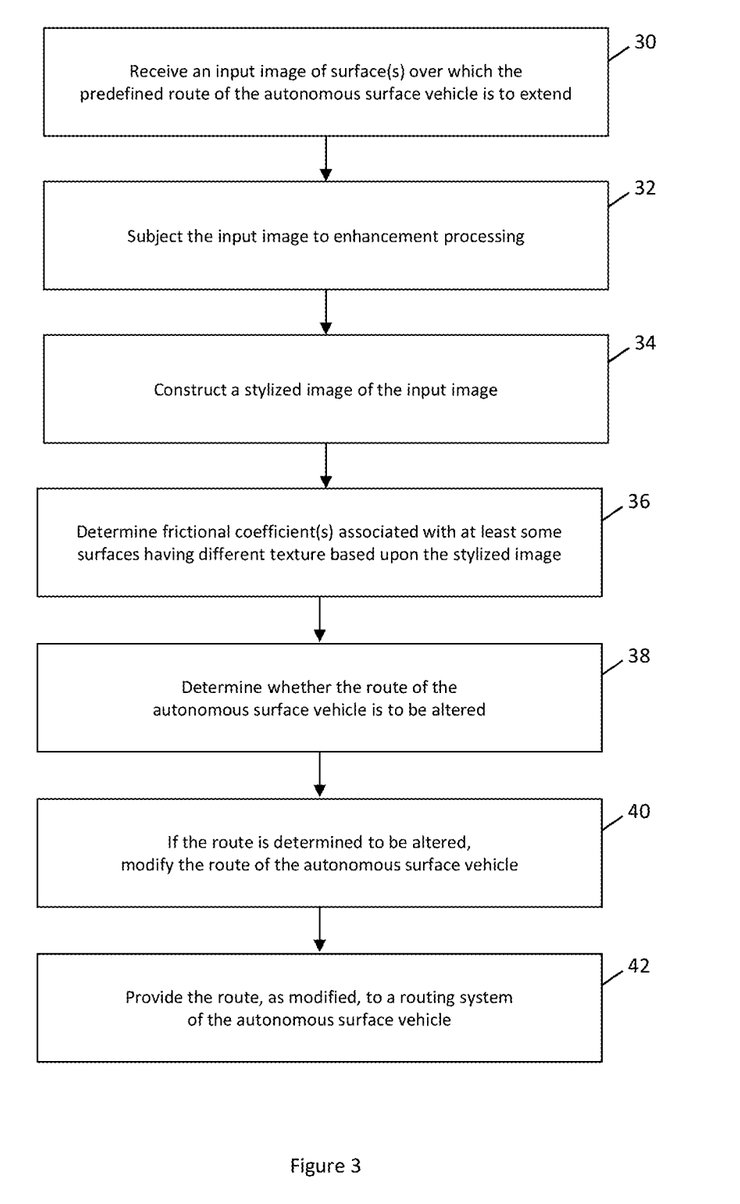
FIG. 3 is a flowchart illustrating operations performed, such as by the computing device of FIG. 2, in order to facilitate modification of the route of the autonomous surface vehicle in accordance with an example embodiment of the present disclosure.

Referring now to FIG. 3, operations performed in order to facilitate modification of the route 14 of an autonomous surface vehicle 10 are illustrated. As shown in block 30 of FIG. 3, the computing device 20 includes means, such as the processing circuitry 22, the communication interface 26 or the like, for receiving an input image of one or more surfaces over which the predefined route of the autonomous surface vehicle is to extend. The input image may be captured by any of a variety of image capture devices, such as a camera, video recorder or the like. In one embodiment, the input image is captured by an image capture device carried by the autonomous surface vehicle such that the field of view of the image capture device is in advance of the autonomous surface vehicle and includes one or more surfaces over which the predefined route of the autonomous surface vehicle is to extend. For example, the rectangle designated 17 in FIG. 1 represents the field of view of an image capture device onboard the autonomous surface vehicle and, as a result, would be represented by the corresponding input image obtained by the image capture device. Alternatively, the input image may be captured by image capture devices, such as cameras, that are offboard the autonomous surface vehicle, such as traffic cameras, security cameras or other types of image capture devices that are positioned to have a field of view that includes one or more surfaces over which the predefined route of the autonomous surface vehicle extends. Although a variety of different types of input images may be received, the input image of an example embodiment is a photographic image. The input image may include all of the surfaces over which the predefined route of the autonomous surface vehicle is to extend or only some of the surfaces over which the predefined route of the autonomous surface vehicle is to extend, such as those surfaces that are closest to the autonomous surface vehicle and over which the autonomous surface vehicle will soon travel unless the route is modified.

As shown in block 32 of FIG. 3, the computing device 20 of some embodiments may also include means, such as the processing circuitry 22, for subjecting the input image that is received to enhancement processing in order to, for example, enhance the relief, that is, the differences in height, exhibited by the surfaces that appear within the input image, thereby accentuating the texture of the surfaces. The enhancement processing may be performed in various manners, but, in one embodiment, the processing circuitry relies upon the OpenCV library of computer vision functions to perform the enhancement processing. In another embodiment, the enhancement processing may include reference to forward looking infrared (FLIR) imaging that provides information regarding the temperature of the surfaces such that the input image is enhanced by including information regarding the temperature of the surfaces.

As shown in block 34 of FIG. 3, the computing device 20 also includes means, such as the processing circuitry 22, for constructing a stylized image of the input image. The stylized image distinguishes between surfaces having different texture that are present in the input image. Although the stylized image may be constructed in various manners, the computing device, such as the processing circuitry, of an example embodiment is configured to construct the stylized image of the input image by defining geometric objects to represent the surfaces having different texture that are present in the input image and associating texture information with respect to geometric objects. Thus, for an input image having a surface with a first portion that is covered with ice and a second portion that is concrete and that is free of ice, the first portion of the surface that is covered with ice may be represented by a first geometric object, while the second portion of the surface that is free of ice may be represented by a second geometric object, different than the first geometric object. By representing the different portions of the surface with different geometric objects, the resulting stylized image distinguishes between the different portions of the surface that have different texture, namely, the smooth texture of ice and the rougher texture of concrete in this example.

In this example embodiment, the computing device 20, such as the processing circuitry 22, is also configured to construct the stylized image of the input image by associating texture information with respective geometric objects. This texture information provides an indication of the texture of the surface represented by a respective geometric object. In the foregoing example, the texture information associated with the first geometric object would be indicative of the smooth texture provided by an icy surface, while the texture information associated with the second geometric object would be indicative of the rougher texture of the concrete surface.

The computing device 20, such as the processing circuitry 22, may be configured to construct the stylized image of the input image in various manners. In an example embodiment, however, the computing device, such as the processing circuitry, is configured to construct a stylized image of the input image by generating the stylized image utilizing a first machine learning model 22a, such as a first machine learning model that implements an edge detection algorithm, that has been trained to distinguish between surfaces having different texture that appear in images. As shown in FIG. 2, the processing circuitry may be configured to implement the first machine learning model that receives the input image and generates the resulting stylized image based upon the training of the model to distinguish between surfaces having different texture. In other embodiments, the first machine learning model is stored, such as in the memory device 24 or a database with which the computing device is in communication, and is able to be retrieved by the processing circuitry in response to receiving an input image in order to generate the stylized image therefrom. Although the first machine learning model may be trained to distinguish between surfaces having different textures that appear in images in various manners, one example of the manner in which the first machine learning model may be trained is provided below by way of example, but not of limitation.

As shown in block 36 of FIG. 3 and based upon the stylized image, the computing device 20 includes means, such as the processing circuitry 22 or the like, for determining a frictional coefficient associated with at least some of the surfaces having different texture. In the foregoing example, the computing device, such as the processing circuitry and, more particularly, a second machine learning model 22b, would therefore be configured to determine a first frictional coefficient associated with the first, icy portion of the surface that is visible within the input image and a second frictional coefficient, different than the first frictional coefficient, associated with the second, concrete portion of the surface that is free of ice and that is also visible in the input image.

The computing device 20, such as the processing circuitry 22, may be configured to determine the frictional coefficients in various manners. In an example embodiment, however, the computing device, such as the processing circuitry, is configured to determine the frictional coefficient utilizing a second machine learning model 22b, such as a convolutional neural network (CNN) classification model, that has been trained to estimate the frictional coefficients of surfaces having different texture that appear in a stylized image. As noted above, the stylized images having surfaces with different texture may represent those surfaces with different geometric objects and with texture information associated therewith. As such, the stylized image may be provided to the second machine learning model which, in turn, generates frictional coefficients for each of the different surfaces represented by geometric objects in the stylized image. Although the second machine learning model may be trained in various manners, one example technique for training the second machine learning model is also described below by way of example, but not of limitation.

As shown in block 38 of FIG. 3, the computing device 20 also includes means, such as the processing circuitry 22 or the like, for determining whether the route of the autonomous surface vehicle 10 is to be altered from its predefined route 14 based upon the frictional coefficient that has been determined to be associated with the surface over which the predefined route of the autonomous surface vehicle extends. Although the computing device, such as the processing circuitry, may be configured to make this determination in various manners, the computing device, such as the processing circuitry, of an example embodiment is configured to identify those surfaces along the predefined route of the autonomous surface vehicle that are slippery or that otherwise may not provide sufficient traction for the autonomous surface vehicle to continue along the predefined route. For example, the computing device, such as the processing circuitry, may be configured to identify the surfaces within the stylized image having frictional coefficients that satisfy a predefined threshold, such as surfaces represented by the stylized image having frictional coefficients that are less than a predefined threshold since smaller frictional coefficients are indicative of more slippery surfaces than surfaces having larger frictional coefficients. For example, the frictional coefficient of ice may be a small value close to zero, while the frictional coefficient of concrete may be a larger value, such as greater than 0.6.

In an instance in which none of the surfaces represented by the stylized image have a frictional coefficient that satisfies the predefined threshold, the computing device 20, such as the processing circuitry 22, is configured to determine that the predefined route 14 of the autonomous surface vehicle 10 need not be modified since the surfaces over which the autonomous surface vehicle are to pass have not been determined to be sufficiently slippery. However, in an instance in which the computing device, such as the processing circuitry, determines that one or more of the surfaces over which the predefined route of the autonomous surface vehicle extends do have a frictional coefficient that satisfies the predefined threshold, such as by being less than the predefined threshold, the computing device, such as the processing circuitry, is configured to determine that the route of the autonomous surface vehicle should be altered. In this regard, the route of the autonomous surface vehicle should be altered so as to avoid the one or more surfaces that have been determined to have a frictional coefficient that satisfies the predefined threshold.

In an instance in which the route of the autonomous surface vehicle 10 is to be modified, the computing device 20 of an example embodiment also includes means, such as the processing circuitry 22 or the like, for modifying the route of the autonomous surface vehicle in response determining that the route of the autonomous surface vehicle is to be altered from the predefined route 14. See block 40. The computing device, such as the processing circuitry, may be configured to modify the route in various manners. In an example embodiment, the computing device, such as the processing circuitry, is configured to access map data of the region in which the autonomous surface vehicle is operating. The map data may be stored, for example, by the memory device 24 or by a database with which the processing circuitry is in communication. Based upon the map data, the computing device, such as the processing circuitry, may be configured to define alternative route that still directs the autonomous surface vehicle from its current location to the intended destination, but does so in a manner that avoids the surface(s) that have been identified to have frictional coefficients that satisfy the predefined threshold. In other words, the computing device, such as the processing circuitry, is configured to define an alternative route that avoids those surface(s) that have been determined to have frictional coefficients that would render the surfaces slippery and correspondingly create an increased risk of slippage for the autonomous surface vehicle. Although the route may be modified such that the autonomous surface vehicle takes a different runway, taxiway, road or path, the computing device of another example embodiment may determine that the route need only be slightly modified as even a slight path alteration could result in significant benefits. For example, an alteration of inches in one direction could prevent hydroplaning or avoid black ice conditions.

In an example embodiment and as depicted in block 42 of FIG. 3, the computing device 20 of an example embodiment also includes means, such as the processing circuitry 22, the communication interface 26 or the like, for providing the route, as modified, to a routing system of the of the autonomous surface vehicle 10. In response, the autonomous surface vehicle can alter its route and then advance in accordance with the alternative route in order to avoid the surface(s) that have been identified to have frictional coefficients that satisfy the predefined threshold. As such, the likelihood that the autonomous surface vehicle will arrive at the intended destination without experiencing slippage or otherwise at least partially losing control and, as a result, with a lower risk of being involved in an accident is increased. In some embodiments, the computing device, such as the processing circuitry and/or the user interface 28, may be configured to cause the alternative route to be displayed.

One example of an alternative route 16 is depicted in dotted lines in FIG. 1. As shown, the autonomous surface vehicle 10, such as the UAV, is re-routed so as to no longer proceed along the predefined route 14 that crossed an icy portion 18 of the taxiway 12. Instead, the alternative route directs the UAV to the same intended destination, but over surfaces that have larger frictional coefficients, such as over concrete taxiways that are not covered with ice.

The computing device 20, method and computer program product of an example embodiment may be configured to determine whether the route of the autonomous surface vehicle 10 is to be altered and, if so, to provide a modified route to the autonomous surface vehicle in real-time or near real-time. Thus, the process described above in relation to FIG. 3 may be repeated as additional input images are provided such that an autonomous surface vehicle that is advancing along the predefined route 14 and capturing images of the surfaces in advance of the autonomous surface vehicle may be rerouted in real-time or near real-time in an instance in which one or more of the input images captured by the image capture device of the autonomous surface vehicle depicts a surface that is determined to have a frictional coefficient that satisfies the predefined threshold and which is, therefore, potentially slippery.

Figure 4:
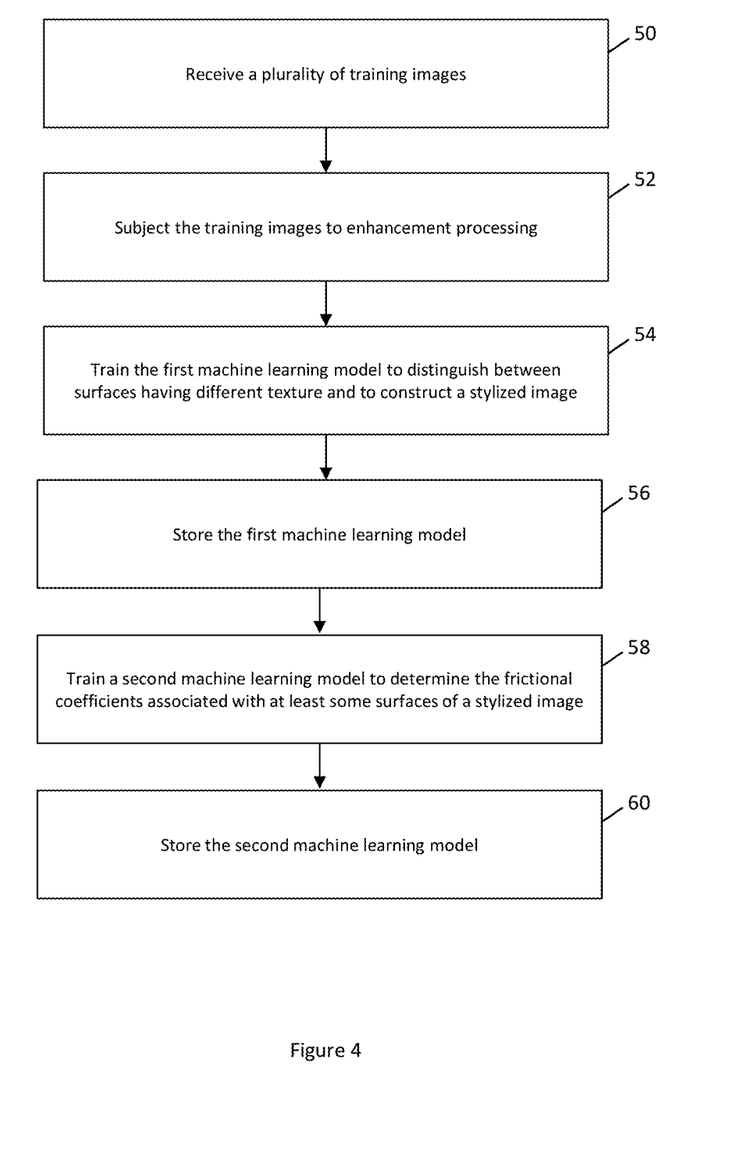
FIG. 4 is a flowchart of the operations performed, such as by the computing device of FIG. 2, in order to train machine learning models to facilitate modification of the route of an autonomous surface vehicle in accordance with an example embodiment of the present disclosure.

The first and second machine learning models 22a, 22b that are utilized to facilitate modification of the route 14 of an autonomous surface vehicle 10 may be trained in various manners. In an example embodiment, however, one technique for training the machine learning models is depicted in FIG. 4. As shown in block 50, the computing device 20 includes means, such as the processing circuitry 22, the communication interface 26 or the like, for receiving a plurality of training images depicting surfaces having different, known textures. Any of a variety of different types of training images, such as photographic images, depicting surfaces from a variety of different directions, under various lighting conditions and from different distances may also be provided to the computing device. Although the training images may be photographic images, other types of training images may be utilized including light detection and ranging (LIDAR) images of surfaces having different, known textures and/or three-dimensional images depicting surfaces having different, known textures, etc.

As shown in block 52 of FIG. 4, the computing device 20 of an example embodiment also includes means, such as the processing circuitry 22 or the like, for subjecting the training images to enhancement processing in order to, for example, enhance the relief exhibited by the surfaces that appear within the training images, thereby accentuating the texture of the surfaces. The enhancement processing may be performed in various manners, but, in one embodiment, the processing circuitry relies upon the OpenCV library of computer vision functions to perform the enhancement processing.

As shown in block 54 of FIG. 4 and based upon the plurality of training images depicting surfaces having different, known textures, the computing device 20 includes means, such as the processing circuitry 22 or the like, for training the first machine learning model 22a, such as a first machine learning model that implements an edge detection algorithm, to distinguish between surfaces having different textures and to construct a stylized image from a training image that distinguishes between surfaces having different textures that are present in the training image. Although the first machine learning model may be trained in various manners, the computing device, such as the processing circuitry, of an example embodiment is configured to train the first machine learning model in an iterative manner with feedback provided to the first machine learning model based upon the stylized image that is generated relative to the known textures of the training image.

The stylized image that is generated by the first machine learning model 22a may include geometric objects that represent the surfaces having different texture that are present in the training image and may associate texture information with the respective geometric objects. In order to train the first machine learning model, the computing device 20, such as the processing circuitry 22, may be configured to compare the resulting stylized image including the texture information associated with respective geometric objects with the known textures of the different surfaces that appear in the training image and to then provide feedback to the first machine learning model reinforcing the generation of the geometric objects having associated texture information that is consistent with the known texture of the surfaces represented by the geometric objects and providing an indication of the discrepancy in an instance in which the geometric object and the texture information associated therewith differs, such as by differing by more than a predetermined amount, from the known texture associated with the surface represented by the geometric object. By repeating this training process for a plurality of training images, the computing device, such as the processing circuitry, is configured to train the first machine learning model to accurately distinguish between surfaces having different textures and to construct a stylized image from a training image that accurately distinguishes between surfaces having different texture that are present in the training image.

The computing device 20 of an example embodiment also includes means, such as the processing circuitry 22, the memory device 24 or the like, for storing the first machine learning model 22a, such as in the memory device or in a database with which the computing device is in communication. See block 56. In some example embodiments, the computing device, such as the processing circuitry, the memory device or the like, is also configured to store the plurality of stylized images that are constructed by the first machine learning model from the plurality of training images. The plurality of stylized images may also be stored by the memory device or in a database that is in communication with the computing device.

As shown in block 58 of FIG. 4, the computing device 20 of this example embodiment also includes means, such as the processing circuitry 22 or the like, for training a second machine learning model 22b, such as a convolutional neural network (CNN) classification model, to determine the frictional coefficients associated with at least some of the surfaces of a stylized image that have different texture and that are distinguished by the stylized image. In order to train the second machine learning model, the computing device, such as the processing circuitry, may be configured to provide the second machine learning model with a plurality of stylized images, such as the stylized images generated or constructed by the first machine learning model 22a. As such, the first machine learning model may be utilized to construct the plurality of stylized images that are, in turn, utilized to train the second machine learning model from respective training images. Additionally, the training of the second machine learning model may utilize predefined frictional coefficients associated with surfaces having different texture. The predefined frictional coefficients may be stored by the memory device 24 or in a database with which the processing circuitry is in communication.

In regards to the training of the second machine learning model 22b, the computing device 20, such as the processing circuitry 22, is configured to provide to the second machine learning model a stylized image that defines geometric objects to represent surfaces having different texture and that associates texture information with respective geometric objects. The second machine learning model determines the frictional coefficient associated with at least some of the surfaces having different texture. In doing so, the second machine learning model may utilize the predefined frictional coefficients associated with surfaces having different texture to determine the frictional coefficients of the surfaces having the different texture that appear in the stylized image. As with the first machine learning model 22a, the computing device, such as the processing circuitry, may train the second machine learning model in an iterative manner. As such, the computing device, such as the processing circuitry, of an example embodiment may be configured to compare the frictional coefficients associated with at least some of the surfaces that are determined by the second machine learning model to the predefined frictional coefficients associated with the surfaces having the same texture as the surfaces in the stylized image.

In order to train the second machine learning model 22b, the computing device 20, such as the processing circuitry 22, may be configured to provide feedback to the second machine learning model reinforcing the determination of the frictional coefficients by the second machine learning model that are consistent with the frictional coefficients associated with surfaces having the same texture as those in the stylized image. Additionally, the feedback provided to the second machine learning model may be configured to indicate a discrepancy in an instance in which the frictional coefficients generated by the second machine learning model are inconsistent, such as by differing by more than a predetermined amount, relative to the frictional coefficients associated with surfaces having the same texture as those in the stylized image. By repeating this training process for a plurality of stylized images, the computing device, such as the processing circuitry, is configured to train the second machine learning model to accurately define the frictional coefficients for surfaces having different textures that are present in an image.

The computing device 20 of an example embodiment also includes means, such as the processing circuitry 22, the memory device 24 or the like, for storing the second machine learning model 22b, such as in the memory device or in a database with which the computing device is in communication. See block 60.

Once trained, the first and second machine learning models 22a, 22b may be utilized by the computing device 20, such as the processing circuitry 22, in order to facilitate modification of the route 14 of an autonomous surface vehicle 10, such as in the manner described above in conjunction with FIG. 3. In this regard, the computing device, method and computer program product may take into account changes in the surfaces over which the autonomous surface vehicle is to drive and may cause the route taken by the autonomous surface vehicle to be modified to avoid certain surfaces that have changed in such a manner so as to increase the risk of the autonomous surface vehicle slipping or otherwise at least partially losing control. By modifying the route, the risk of an accident or other incident involving the autonomous surface vehicle may therefore be reduced.

As described above, FIG. 3 is a flowchart illustrating the operations performed by a computing device 10, method, and computer program product to facilitate modification of a route 14 of an autonomous surface vehicle 10, while FIG. 4 is a flowchart illustrating the operations performed by a computing device, method and computer program product to train machine learning models to facilitate modification of a route of an autonomous surface vehicle. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the computing device and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for facilitating modification of a route of a vehicle, the method comprising:

receiving an input image of at least one surface extending along the route of the vehicle;

constructing a stylized image of the input image, wherein the stylized image is an enhanced version of the input image representing different surfaces found in the input image as geometric objects with a texture associated with each geometric object, wherein the stylized image distinguishes between surfaces having different textures that are present in the input image;

based upon the stylized image, determining a frictional coefficient associated with at least some of the surfaces having different textures; and determining whether the route of the vehicle is to be altered from a predefined route based upon the frictional coefficient that has been determined to be associated with a surface over which the predefined route of the vehicle extends.

2. A method according to claim 1 wherein constructing the stylized image of the input image comprises generating the stylized image utilizing a first machine learning model that has been trained to distinguish between surfaces having different textures that appear in images.

3. A method according to claim 1 wherein constructing the stylized image of the input image comprises:

defining geometric objects to represent the surfaces having different textures that are present in the input image; and associating texture information with respective geometric objects.

4. A method according to claim 1 wherein determining the frictional coefficient comprises determining the frictional coefficient utilizing a second machine learning model that has been trained to estimate frictional coefficients of surfaces having different textures that appear in stylized images.

5. A method according to claim 1 further comprising modifying the route of the vehicle in response to determining that the route of the vehicle is to be altered from the predefined route.

6. A method according to claim 5 further comprising providing the route, as modified, to a routing system of the vehicle.

7. A method according to claim 1 further comprising receiving the input image that has been captured by an image capture device of the vehicle.

8. A method according to claim 1 wherein the input image comprises a photographic image.

9. A computing device configured to facilitate modification of a route of a vehicle, the computing device comprising processing circuitry configured to:

receive an input image of at least one surface extending along the route of the vehicle construct a stylized image of the input image, wherein the stylized image is an enhanced version of the input image representing different surfaces found in the input image as geometric objects with a texture associated with each geometric object, wherein the stylized image distinguishes between surfaces having different textures that are present in the input image;

based upon the stylized image, determine a frictional coefficient associated with at least some of the surfaces having different textures; and determine whether the route of the vehicle is to be altered from a predefined route based upon the frictional coefficient that has been determined to be associated with a surface over which the predefined route of the vehicle extends.

10. A computing device according to claim 9 wherein the processing circuitry comprises a first machine learning model that has been trained to distinguish between surfaces having different textures that appear in images, and wherein the processing circuitry is configured to construct the stylized image of the input image utilizing the first machine learning model.

11. A computing device according to claim 9 wherein the processing circuitry is configured to construct the stylized image of the input image by defining geometric objects to represent the surfaces having different textures that are present in the input image and by associating texture information with respective geometric objects.

12. A computing device according to claim 9 wherein the processing circuitry comprises a second machine learning model that has been trained to estimate frictional coefficients of surfaces having different textures that appear in stylized images, and wherein the processing circuitry is configured to determine the frictional coefficient utilizing the second machine learning model.

13. A computing device according to claim 9 wherein the processing circuitry is further configured to modify the route of the vehicle in response to determining that the route of the vehicle is to be altered from the predefined route.

14. A computing device according to claim 13 further comprising a communication interface, responsive to the processing circuitry, configured to provide the route, as modified, to a routing system of the vehicle.

15. A computing device according to claim 9 further comprising a communication interface configured to receive the input image that has been captured by an image capture device of the vehicle.

16. A computing device according to claim 9 wherein the input image comprises a photographic image.

17. A method for training machine learning models to facilitate modification of a route of a vehicle, the method comprising:

based upon a plurality of training images depicting surfaces having different, known textures, training a first machine learning model to distinguish between surfaces having different textures and to construct a stylized image from a respective training image that distinguishes between surfaces having different textures that are present in the respective training image;

storing the first machine learning model;

based upon a plurality of stylized images that distinguish between surfaces having different textures and also based upon predefined frictional coefficients associated with surfaces having different textures, training a second machine learning model to determine a frictional coefficient associated with at least some of the surfaces having different textures; and storing the second machine learning model.

18. A method according to claim 17 further comprising utilizing the first machine learning model to construct the plurality of stylized images that are utilized to train the second machine learning model from respective training images.

19. A method according to claim 17 wherein the first machine learning model is trained to construct the stylized image from the respective training image by defining geometric objects to represent the surfaces having different textures that are present in the respective training image and by associating texture information with respective geometric objects.

20. A method according to claim 17 further comprising receiving the plurality of training images depicting surfaces over which a vehicle is capable of driving.

* * * * *